Patented Aug. 12, 1941

2,252,557

UNITED STATES PATENT OFFICE 2,252,557

POLYMERIC MATERIALS

Edward Peter Czerwin, Wilmington, Del., assignor to E. I. du Pont de Nemours & Company, Wilmington, Del., a corporation of Delaware No Drawing. Application April 4, 1939, Serial No. 266,001

12 Claims. (Cl. 260—78)

This invention relates to synthetic linear polyamides, and more particularly to a new interpolyamide possessing unusual and valuable properties.

The fiber-forming or linear polyamides to which this invention relates are in general high melting products of pronounced crystallinity and insolubility in most solvents except mineral acids, formic acid, and the phenols. Although these properties, together with those of great strength and excellent elasticity, are highly valuable in the manufacture of textile fibers, these same properties make it difficult to prepare clear sheets, coating compositions, and other products which require the use of solvents beyond the restricted range mentioned above.

It is known that valuable fiber-forming polyamides can be obtained by the polymerization of 6-aminocaproic acid or its amide-forming derivatives. As ordinarily carried out, this reaction yields about 75% polymer and 25% of caprolactam. It is further known that valuable fiber-forming polyamides can be prepared from the reaction of hexamethylenediamine with a substantially equimolecular quantity of adipic acid or an amide-forming derivative thereof. Both of these polyamides are characterized by high and sharp melting points (210° C. and 264° C. respectively, in a glass tube in absence of oxygen) and by insolubility in most solvents. Phenols and certain acids are practically the only solvents for these polymers. While high melting point and low solubility are advantages for certain uses, they are definite drawbacks for others. Thus, if it is desired to use the polymers as coating compositions by the conventional method of application from a solvent, the phenol or acid solutions are unsatisfactory because of toxicity, low volatility, and corrosive action. Another drawback of these polyamides for certain uses is their marked tendency to crystallize in large aggregates, which makes it difficult to prepare clear films and sheets therefrom.

This invention has as an object the preparation of linear interpolyamides, which in addition to being fiber-forming have properties of improved solubility, lower and generally wider melting range, lessened crystallinity, and a more resin-like character which confers to the new interpolyamides a wider utility in the arts than heretofore possible with other polyamides. A further object is to prepare from 6-aminocaproic acid as one component interpolyamides low in lactam component. Other objects will appear hereinafter.

These objects are accomplished by heating at amide-forming temperature 6-aminocaproic acid, hexamethylenediamine and adipic acid, or amide-forming derivatives of said reactants, the diamine and dibasic acid being used in essentially equimolecular proportions, until substantially all the reactants have combined to form polymer.

I have now found that the above mentioned drawbacks in polyamides obtained from 6-aminocaproic acid, or from hexamethylenediamine and adipic acid can be overcome by copolymerizing the reactants which are used to make these two polymers. This copolymerization does not yield a mixture of the two polymers, but a true interpolymer. Furthermore, it has been found that if the reaction is continued sufficiently long and the water formed in the reaction is retained for a sufficient time, the lactam content can be greatly reduced. This is highly advantageous because it avoids loss of amino acid reactant and because the presence of lactam in the polymer is objectionable. The lactam has a softening action on the polymer and produces bubbles or voids in the polymer at elevated temperatures.

The preferred procedure for preparing the interpolymers of this invention consists in heating the reactants in a closed system with retention of the water of reaction until substantially all the reactants have combined to form polymer. Under these conditions the caprolactam formed as an initial by-product in the reaction is converted into polymer, probably through intermediate hydrolysis to aminocaproic acid. Indeed, it is preferable to add water to the original reactants, e. g., 5-50% based on the weight of the reactants, in carrying out the initial polymerization. This is particularly true when the interpolymers are prepared directly from caprolactam as the amino acid constituent. After the initial heating with retention of water, e. g., in a closed system or under superatmospheric pressure, the heating is continued with removal of water until a product of the desired properties is obtained.

In making a fiber-forming product, the reaction is continued until a test portion indicates that the product can be formed into pliable fibers. Another method of following the course of the reaction is to determine the intrinsic viscosity of the polymer as defined in U. S. Patent 2,130,948. To obtain a fiber-forming product, the reaction is continued until the intrinsic viscosity is at least 0.4 and preferably at least 0.6, since the strength and toughness of the product increase with increase in intrinsic viscosity. In order to reduce the quantity of lactam to a minimum, in addition to the initial heating in the presence of water, it is desirable to evacuate the reaction mixture while in the molten state at the end of the heating cycle. In this manner, the lactam content can be lowered to below 3%.

The following examples, in which parts are given by weight, illustrate the invention in greater detail:

EXAMPLE I

A mixture of 6 parts of 6-aminocaproic acid (M. P. 201°–203° C.) and 4 parts of hexamethylene diammonium adipate (salt derived from hexamethylenediamine and adipic acid) was heated in an evacuated, sealed tube for 2 hours at 210°–230° C. The low molecular weight polymer thus obtained was heated for 2 hours more at 220°–240° C. under a pressure of 2 mm. The interpolyamide obtained was an opalescent, tough, pseudo-resinous solid. It had an intrinsic viscosity of 0.98 and, on a heated metal block, fibers of the interpolymer melted over the range of 155°–160° C. The interpolymer was soluble in formic acid, phenol, and hot glacial acetic acid. Unlike either polyhexamethylene adipamide or the polyamide from 6-aminocaproic acid, the interpolymer was soluble in hot butanol and mixtures of alcohols with halogenated hydrocarbons, such as methanol-chloroform, methanol-beta-trichloroethane, and methanol-trichloroethylene mixtures. Unsaturated alcohols, such as methallyl alcohol and methyl ethyl ethynyl alcohol, were also good solvents for the interpolymer. The interpolymer could be spun into filaments which on cold drawing yielded oriented fibers of good strength. Molded films of this material were clear and pliable.

Products possessing properties intermediate between those of the simple polyamides and the above interpolymers were obtained by using varying amounts of the ingredients mentioned above, namely, 6-aminocaproic acid and hexamethylenediammonium adipate. The melting point-composition curve for this system passes through a minimum at about 155° C. Clarity and ease of solubility increase as the composition of the interpolymer approaches that possessed by the minimum melting product. The table below gives the melting point, as determined for small particles (fibers) on a heated block in air, for fiber-forming polymers prepared from various proportions of these two ingredients.

*Melting points of various hexamethylene adipamide-poly-6-aminocaproic acid interpolymers*

| Hexamethylene adipamide* | | Poly-6-aminocaproic acid* | | Melting point, °C. |
|---|---|---|---|---|
| Weight | Mols | Weight | Mols | |
| 0 | 0.0 | 100 | 100.0 | 205–207 |
| 10 | 5.3 | 90 | 94.7 | 176–178 |
| 15 | 8.1 | 85 | 91.9 | 170–172 |
| 20 | 11.1 | 80 | 88.9 | 165–167 |
| 30 | 17.6 | 70 | 83.4 | 158–160 |
| 40 | 25.0 | 60 | 75.0 | 154–156 |
| 45 | 29.0 | 55 | 71.0 | 159–160 |
| 50 | 33.3 | 50 | 66.7 | 161–163 |
| 60 | 42.8 | 40 | 57.2 | 174–177 |
| 80 | 66.7 | 20 | 33.3 | 213–215 |
| 100 | 100.0 | 0 | 0.0 | 248–249 |

*Parts by weight of salt and acid, respectively, employed.

EXAMPLE II

A mixture of 300 parts of hexamethylene diammonium adipate, 450 parts of caprolactam (B. P. 107–112° C./0.5 mm.), and 50 parts of water was placed in a stainless steel autoclave. Air was removed from the system by evacuation, followed by filling the free space with oxygen-free nitrogen and evacuating again. The autoclave was then heated to 265°–270° C. during one hour and maintained at that temperature for five hours, during which time the pressure rose to about 300 lbs./sq. in. within the closed system. The pressure was then reduced to atmospheric during the course of 0.6 hour while maintaining the temperature, and finally the autoclave was evacuated slowly (during 0.5 hour) to 100 mm. The reaction was completed by maintaining the autoclave at this pressure for 2.5 hours. The molten interpolymer was then removed from the autoclave by extrusion under pressure through a slot orifice. The sheet thus obtained was very transparent, tough and quite pliable. The interpolymer, which melted at 156°–158° C. and had an intrinsic viscosity of 1.06, possessed the same solubility characteristics as the interpolymer prepared with the use of amino acid. It could be spun into filaments which on cold drawing gave oriented fibers of great strength. The interpolymer contained about 5.4% of caprolactam monomer as determined by sublimation methods.

In a similar experiment in which the initial heating period under pressure (autoclave closed) was 12 hours, the caprolactam content of the product was less than 2%.

EXAMPLE III

A mixture of 65.5 parts of hexamethylenediammonium adipate, 57 parts of epsilon-aminocapronitrile (B. P. 133° C./30 mm.), (equivalent to 65.5 parts of the amino acid), and 54 parts of water was heated in a sealed tube in the absence of oxygen for 18 hours at 190°–200° C. and then for 3 hours more at 220°–230° C. The tube was then opened and heated for 3 hours at 230°–240° C. under a pressure of 2 mm. The interpolymer thus obtained was a colorless, pseudo-resinous tough solid which melted at about 161°–162° C. (in the form of fiber). It had an intrinsic viscosity of 0.65 and could be spun into filaments capable of being cold drawn into oriented fibers. Molded films of this material were quite clear and pliable. The interpolymer possessed solubility characteristics similar to the interpolymers described in the preceding examples.

The foregoing examples describe the preparation of the interpolymers of this invention with the use of 6-aminocaproic acid, caprolactam and aminocapronitrile. While these reactants constitute the preferred forms in which to use the amino acid constituent, it should be understood that other amide-forming derivatives of aminocaproic acid, e. g. its esters, may also be used. Likewise, in place of using hexamethylenediamine and adipic acid in the form of the salt, amide-forming derivatives of the diamine or dibasic acid may be used. Typical amide-forming derivatives of adipic acid are its esters, anhydride, and amide. If the diamine is used as its hydrochloride (amide-forming derivative), the adipic acid is used in the form of a salt, e. g. sodium adipate. If a high molecular weight product is desired, the diamine and dibasic acid must be used in substantially equimolecular amounts, i. e. not more than 5% excess of either should be used. The ratio of amino acid to diamine-dibasic acid mixture used depends upon the properties of the product desired. This is apparent from the table given in Example I. The preferred products from the standpoint of solubility are those in which the molar ratio of amino acid constituent to diamine-dibasic acid constituent (e. g. salt) ranges from 1:1 to 6:1, or in other words, in which the amino acid constitutes from about 50 to 85 molar per cent of the total polyamide-forming composition, considering the diamine-dibasic acid portion as one constituent. Of these preferred products those in which the ratio of the amino acid constituent to the diamine-dibasic acid constituent ranges from 1.3:1 to 3:1, i. e., in which the amino acid constitutes from about 55 to 75 molar per cent of the total polyamide-forming composition, have the greatest solubility.

Although the preferred procedure is to carry out the reaction in the presence of water, other diluents, e. g. solvents such as the phenols, partial solvents such as alcohols, or non-solvents such as mineral oil, may be used. Furthermore, it is possible to carry out the reaction in the presence of modifying agents, e. g. plasticizers, viscosity stabilizing agents, pigments, etc. Since polyamides have a tendency to darken in the presence of air at elevated temperatures, it is desirable to carry out the polymerization under oxygen-free conditions. An antioxidant may also be added. The preferred temperature range lies between 180° and 300° C.

The interpolymers of this invention are soluble in the solvents (phenols and carboxylic acids) which have a solvent action on polymeric aminocaproic acid and polyhexamethylene adipamide. As indicated in Example I, they are also soluble in hot alcohols such as butanol and benzyl alcohol, in mixtures of alcohols with chlorinated hydrocarbons, and in unsaturated alcohols. It is surprising that the interpolymer should be so much more soluble than either the amino acid polymer or polyhexamethylene adipamide, for the interpolymer like the individual polymers is a straight chain polymer made up of segments, each one of which contains six carbon atoms. On hydrolysis with hydrochloric acid the interpolyamide yields a mixture of products comprising aminocaproic acid (as hydrochloride), hexamethylenediamine (as hydrochloride), and adipic acid.

The interpolymers of this invention, it may be observed, form a subclass under the broad class of amino acid-diamine-dibasic carboxylic acid interpolymers which form the subject matter of Carothers S. N. 266,014, filed concurrently herewith, and assigned to the assignee hereof.

The products of this invention are useful in making fibers, filaments, sheet material, films, e. g. for use as wrapping foil and safety glass, molded articles, electrical insulation, felting compositions, adhesive compositions, and coating compositions.

It will be apparent from the foregoing description that there is obtained by this invention interpolymers having marked advantages over either the 6-aminocaproic acid polymer or polyhexamethylene adipamide in that the present interpolymers have less tendency to crystallize and are therefore readily obtained in the form of transparent films, ribbons, etc.; they melt over a wider range and at a lower temperature; they are soluble in low boiling solvents and are therefore more suitable for application from solution; and they yield more flexible products.

The term "hexamethylenediamine" as used in the claims includes its amide-forming reactants. Likewise, the term "adipic acid" as used in the claims includes its amide-forming derivatives.

As many apparently widely different embodiments of this invention may be made without departing from the spirit and scope thereof, it is to be understood that I do not limit myself to the specific embodiments thereof except as defined in the appended claims.

I claim:

1. An interpolymer obtained by polymerizing a mixture of polyamide-forming reactants comprising hexamethylenediamine and at least two additional amide-forming reactants one of which is adipic acid, and the other of which is a substance of the class consisting of 6-aminocaproic acid and its amide-forming derivatives.

2. The interpolymer set forth in claim 1 in which the 6-aminocaproic acid constituent constitutes from about 50 to 85 molar per cent of the sum of the 6-aminocaproic acid constituent and the hexamethylenediamine-adipic acid constituent, and in which the components of said last-named constituent are in substantially equimolecular proportions.

3. An interpolymer which yields, on hydrolysis with hydrochloric acid, a mixture comprising hexamethylenediamine hydrochloride, adipic acid, and aminocaproic acid hydrochloride.

4. A filament comprising the interpolymer set forth in claim 1.

5. A textile lber comprising the interpolymer set forth in claim 1.

6. Sheet material comprising the interpolymer set forth in claim 1.

7. A process for making interpolymers which comprises heating at reaction temperature a mixture of polyamide-forming reactants comprising hexamethylenediamine and at least two additional amide-forming reactants, one of which is adipic acid and the other of which is a substance of the class consisting of 6-aminocaproic acid and its amide-forming derivatives; the 6-aminocaproic acid constituent in the said mixture constituting from about 50 to 85 molar percent of the sum of the 6-aminocaproic acid constituent and the hexamethylenediamine-adipic acid constituent, and the components of the last-mentioned constituent being present in substantially equimolecular proportions.

8. A process for making interpolymers which comprises heating at reaction temperature a substance of the class consisting of 6-aminocaproic acid and its amide-forming derivatives, and a mixture of substantially equimolecular proportions of hexamethylenediamine and adipic acid, and continuing said heating until the polymeric product obtained is capable of being formed into continuous filaments; the said 6-aminocaproic acid constituent constituting from about 50 to 85 molar percent of the sum of the 6-aminocaproic acid constituent and the hexamethylenediamine-adipic acid constituent.

9. A process of making interpolymers of low lactam content from polyamide-forming reactants one of which is a substance of the class consisting of 6-aminocaproic acid and its amide-forming derivatives, which comprises heating said substance, hexamethylenediamine, and adipic acid, in the presence of water, continuing the heating with retention of water until the major portion of the reactants has combined to form polymer, continuing the heating with removal of water, and then heating the reaction mixture in the molten state under reduced pressure; the 6-aminocaproic acid constituent in the said mixture constituting from about 50 to 80 molar percent of the sum of the 6-aminocapro'- acid constituent and the hexamethylenediamine-adipic acid constituent, and the components of the last-mentioned constituent being present in substantially equimolecular proportions.

10. The process set forth in claim 9 in which said first substance is 6-aminocaprolactam.

11. In a process for making interpolymers, the step which comprises heating under pressure at polymerizing temperatures a mixture comprising hexamethylenediamine, adipic acid, epsilon-aminocapronitrile, and water.

12. A hot butanol soluble interpolymer having a melting point of approximately 174°–177° C. and capable of forming a flexible film on evaporation of solvent from a solution thereof, the said interpolymer being substantially identical with the interpolyamide formed by polymerizing a mixture of approximately 60 parts by weight of hexamethylene diammonium adipate and approximately 40 parts by weight of 6-aminocaproic acid.

EDWARD PETER CZERWIN.